United States Patent Office 3,505,001
Patented Apr. 7, 1970

3,505,001
PROCESS FOR TREATING CELLULOSIC MATERIALS
George M. Wagner, Lewiston, N.Y., assignor to Hooker Chemical Corporation, Niagara Falls, N.Y., a corporation of New York
No Drawing. Filed Nov. 26, 1965, Ser. No. 510,062
Int. Cl. D06m 13/34
U.S. Cl. 8—116.2            6 Claims

ABSTRACT OF THE DISCLOSURE

A process for making cellulosic materials water repellent by treating them with a solution of a polyhydroxy-modified isocyanate composition containing

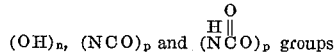

$(OH)_n$, $(NCO)_p$ and $(\overset{H}{N}\overset{O}{\underset{\|}{C}}O)_p$ groups wherein $n$ is a number from 0 to 4.5, $p$ is a number from 1.5 to 6 and $n+p$ is a number from 3 to 6, the polyhydroxy-modified isocyanate being the reaction product of a polyhydroxy compound containing $m$ hydroxy groups and a diisocyanate, which reactants are in a ratio of one mole of polyhydroxy compound to $m-n$ moles of diisocyanate, wherein $m$ is a number from 3 to 6, $n$ is a number from 0 to 4.5 and $m-n$ is at least 1.5, and, thereafter, curing the thus-treated material with water.

---

This invention relates to an improved composition and process for treating cellulosic materials and more particularly, it relates to an improved composition and process for treating cellulosic materials so as to render them water highly water repellent.

In the past, considerable time and effort has been expended in the development of composition and process for treating cellulosic materials so as to render them water repellent. Although many compositions and processes for this purpose have been developed and used, for the most part, none of these have been completely durable to repeated laundryings and/or dry cleanings. Accordingly, cellulosic textile materials which have been treated with the prior art composition to render them water repellent frequently lose this water repellancy and must be retreated to restore it, after several dry cleanings or washings. Additionally, insofar as the cellulosic textiles are concerned, problems have sometimes been encountered in that the prior art water-repellent compositions have adversely altered the hand of the fabric, making them hard and/or stiff and boardy. Moreover, and particularly with regard to the treatment of paper, the cost of the prior art water repellency compositions and processes has frequently been sufficiently great as to discourage their wide spread acceptance and use.

It is, therefore, an object of the present invention to provide a novel treated cellulosic material which is substantially permanently water repellent.

A further object of the present invention is to provide an improved process for treating cellulosic materials so as to render them substantially permanently water repellent, which process is easily and economically carried out.

These and other objects of the present invention will become apparent to those skilled in the art from the description which follows.

Pursuant to the above objects, the present invention includes a process for treating a cellulosic material which comprises contacting the cellulosic material with a polymerizable treating solution comprising a polyhydroxy-modified isocyanate composition containing $(OH)_n$, $(NCO)_p$ and $\left(\overset{H}{N}-\overset{O}{\underset{\|}{C}}-O\right)_p$ groups

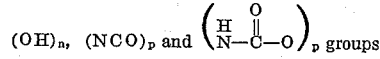

wherein $n$ is a number from 0 to 4.5, $p$ is a number from 1.5–6 and $n+p$ is 3–6 and, thereafter, curing the thus-contacted material with water. Preferably, the polyhydroxy-modified isocyanate composition in the polymerizable treating solution is the reaction product of a polyhydroxy compound containing $m$ hydroxyl groups and a diisocyanate, the reactants being in the ratio of about 1 mole of polyhydroxy compound to $m-n$ moles of diisocyanate, wherein $m$ is a number from 3 to 6 and $n$, as has been defined hereinabove, is a number from 0 to 4.5 and $m-n$ is at least 1.5. The cellulosic materials, including cellulosic textiles and paper, treated in accordance with this process are found to be durably water repellent, even after repeated dry cleaning or washing in hot water. Additionally, the hand or feel of the thus-treated cellulosic textile materials is generally found to be substantially changed from that of an untreated material.

More specifically, in the practice of the present invention, the cellulosic material to be treated include cellulosic textile materials, such as cotton, ramie, rayon, jute, and non-textile materials such as paper, cardboard, wood, and the like. These cellulosic materials may be in various forms, including yard or sheet goods, as well as various finished articles, such as clothing, including coats, shirts, trousers, skirts, and the like, and such non-textile articles as paper containers, bags, wallboard and the like. Of the numerous cellulosic materials with which these articles may be made, the process of the present invention has been found to be particularly applicable in the treatment of cotton and paper. Accordingly, hereinafter, primary reference will be made to cotton and paper as being the preferred cellulosic materials. This is not, however, to be taken as a limitation on the present invention as other cellulosic materials may also be advantageously treated by the present process. Additionally, the process of the present invention is not limited to the treatment of cotton, paper or other cellulosic materials in the form of yard or sheet goods or finished articles, but may, in many instances, also be utilized in treating these materials in the fiber, yarn, or pulp form.

In treating a cellulosic material so as to make it water repellent, the material is impregnated with a solution which comprises as the essential water repelling component, a modified diisocyanate compound, the diisocyanate being modified by being reacted with a polyhydroxy material containing from 3 to 6 hydroxyl groups, so that the resulting modified diisocyanate contains from about 1.5 to 6 NCO groups. Illustrative of the polyhydroxy compounds containing 3 to 6 hydroxyl groups, with which the diisocyanate may be modified are polyhydric alcohols containing 3 to 6 hydroxyl groups, glycerides of hydroxy acids, sugars containing 3 to 6 hydroxyl groups and alkyl and aralkyl polyhydroxy acids, ethers, aldehydes and ketones containing 3 to 6 hydroxyl groups. These materials may contain one or more dissimilar atoms between carbon atoms, such as oxygen, sulfur and the like and may be substituted with non-interfering substituents such as halogens, aryl, including phenyl, naphthyl and the like. By "non-interfering," it is meant substituents having a reactivity with isocyanates which is less than that of the hydroxy group. Generally, these compounds will contain from about 3 to about 80 carbon atoms in a straight or branched chain and may be saturated or unsaturated, i.e., contain one or more double or triple bonds.

Exemplary of polyhydric alcohols which may be used are pentaerythritol, dipentaerythritol, trimethylol propane, trimethylol ethane, trimethylol butane, trimethylol isobutane, trimethylol pentane, trimethylol hexane, trimethylol octane, trimethylol nonane, trimethylol undecane, trimethylol heptadecane, trimethylol propene, trimethylol butene, trimethylol pentene, glycerol, sorbitol, butanetriol, 1,2,3,4,5,6-hexanehexol, inositol, trimethylolpropane adipate, mannitol, methyltrimethylol methane, 1,4,6-octanetriol, 1,2,6-hexanetriol, 1,3,5-hexanetriol, polyallyl alcohol and the like. Sugars which may be used include tetroses, pentoses, hexoses, heptoses, and the like. Tetroses ($C_4H_8O_4$) include aldoses such as threose and erythrose and ketoses like erythrulose. Pentoses ($C_5H_{10}O_5$) include aldoses and ketoses, such as arabinose, xylose, lyxose, ribose, and arabinulose. Hexoses ($C_6H_{12}O_6$) and heptoses ($C_7H_{14}O_7$) include aldoses and ketoses such as glucose, gulose, tagatose, mannose, galactose, dextrose, talose, allose, idose, altrose, fructose, sorbose, levulose, and mannoheptose. Additionally, disaccharides of bioses, trioses and tetroses may also be used.

Exemplary of the glycerides of hydroxy acids are castor oil (glyceride of recinoleic acid), as well as the glycerides of such acids as theronic acid, erythnonic acid, glycolic acid, lactic acid, hydroxybutyric acid, hydroxyvaleric acid, cerebionic acid, hydroacrylic acid, hydroxycaproic acid, hydroxystearic acid, hydroxydecanoic acid, sabinic acid, juniperic acid, jalopinolic acid, β-hydroxyacrylic acid, α-hydroxyvinylacetic acid, ambrettolic acid, glyceric acid, 3,12-dihydroxypalmitic acid, trihydroxy n-butyric acid, trihydroxyisobutyric acid, aleuritic acid, and the like. As has been noted hereinabove, these glycerides contain 3 to 6 hydroxyl groups.

Exemplary of other polyhydroxy compounds which may be used are acids such as trihydroxy n-butyric acid, trihydroxyisobutyric acid, erythronic acid, pentahydroxycaproic acid, threonic acid, aleuritic acid, hexahydroxyheptonic acid, sativic acid, as well as the various aldonic acids including arabonic acid, xylonic acid, ribonic acid, lyxonic acid, gluconic acid, mannonic acid, galactonic acid, gluonic acid, talonic acid, idonic acid, altionic acid, allonic acid pentahydroxy pimelic acid, and the like. Other materials include, ethoxylated castor oil, polyoxyethylene sorbitan monooleate, polyoxyethylene sorbitan monolaurate, polyoxyethylene sorbitan monostearate, polyoxyethylene sorbitan monopalmitate, sorbitan monostearate, sorbitan monolaurate, sorbitan monooleate, sobritan monopalmitate, polyoxyethylene sorbitol laurate, polyoxyethylene sorbitol oleate, sorbitan sesquioleate, populin, picrociocin, urochloralic acid, streptose, taxicatin, tetrakis(hydroxymethyl)phosphonium chloride and the like. Low molecular weight phenolic novolak resins having the hydrogen of the phenolic —OH group replaced with hydroxyl containing alkyl groups and having at least 3 hydroxyls per mole, also serve as useful polyols. Of all of the above compounds, the preferred are castor oil, glycol and trimethylol propane and hereinafter, primary reference will be made to these materials.

Various organic diisocyanates may be modified by the above polyhydroxy materials. Of the hydrocarbon polyisocyanates, the aryl and alkaryl polyisocyanates of the benzene and naphthalene series are more reactive and less toxic than the aliphatic members. Consequently, the aromatic compounds are preferred in the present invention. The preferred compounds which are at present most readily available commercially are 2,4-tolylene diisocyanate, 2,6-tolylene diisocyanate and mixtures thereof. However, others may be used, among them phenyl diisocyanate; alpha-naphthyl diisocyanate; 4-tolylene diisocyanate; n-hexyl diisocyanate; methylene-bis-(4-phenyl isocyanate), 3,3'-bitolylene - 4,4' - diisocyanate, 3,3'-dimethoxy-4,4'-biphenylene diisocyanate; 1,5-naphthalene diisocyanate, 2,4-chlorophenyl diisocyanate; hexamethylene diisocyanate, ethylene diisocyanate; trimethylene diisocyanate; tetramethylene diisocyanate; pentamethylene diisocyanate; decamethylene diisocyanate; 1,3-cyclopentylene diisocyanate; 1,2-cyclohexylene diisocyanate; 1,4-cyclohexylene diisocyanate; cyclopentylidene diisocyanate; cyclohexylidene diisocyanate; p-phenylene diisocyanate; m-phenylene diisocyanate; 4,4'-diphenyl propane diisocyanate; 4,4'-diphenyl methane diphenylene diisocyanate; 1,2-propylene diisocyanate; 1,2-butylene diisocyanate; 2,3-butylene diisocyanate; 1,3-butylene diisocyanate; ethylidene diisocyanate; propylidene diisocyanate; and butylidene diisocyanate. In addition, isothiocyanates and mixtures of isocyanates may be employed. Also contemplated are the many impure or crude polyisocyanates that are commercially available.

The preferred polyhydroxy modified diisocyanates for use in the present process have the following generic formula:

wherein $t$, $t_1$ and $t_2$ are numbers from 0–1 and the sum of $t$, $t_1$ and $t_2$ is at least 1.5; X is hydrogen when $t$, $t_1$, or $t_2$ is 0; and

when $t$, $t_1$ or $t_2$ is 1; R is alkyl containing from 1–25 carbon atoms or dialkyl containing from 8–30 carbon atoms; and R' is alkyl, alkaryl, aralkyl or aryl containing from 6–40 carbon atoms.

It is to be appreciated that similar compounds, other than those which have been specifically set forth hereinabove, may be utilized as water repelling agents in the process of the present invention. Additionally, the water repelling compositions used may be a mixture of one or more of the above compound or other similar compound which fall within the generic formulas which have been given. Often, such mixtures will be the natural result of the preparation of the compositions, which preparations may give a statistical distribution of the possible products.

In preparing the impregnating solutions for use in the method of the present invention, the water repellent component as has been described is dispersed or dissolved in a suitable solvent. Although any solvent, in which the modified isocyanate material will dissolve without decomposition may be used, in many instances, the aromatic organic solvents, such as benzene, toluene, xylene, and the like, are preferred. Additionally, halogenated aliphatic solvents, such as trichloroethylene, perchloroethylene, carbon tetrachloride, methylene chloride, and the like, have also been found to be extremely useful. The solvents may be classified generally as benzene, substituted benzenes containing 1–3 lower alkyl groups of 1–6 carbon atoms each and halogenated lower alkyls containing 1–6 carbon atoms and 1–8 halogens. The water repellent component is dispersed or dissolved in the solvent in an amount sufficient to provide the desired resin add-on on the cellulosic material when the material is impregnated with the solution. Concentrations within the range of about 0.5 to about 50% by weight of the solvent composition are typical, but in many instances higher concentrations are also suitable, up to the maximum solubility of the modified isocyanate material in the solvent used. Typical of such higher concentrations which may be used are those of 80 to 90% by weight of the solvent composition, or even higher, in those instances where the modified isocyanate material is miscible in substantially all proportions with the solvent.

In preparing an impregnating solution for use in the present method, the diisocyanate may be dissolved in a suitable solvent as has been described above. Desirably the solvent used is in an amount from about equal parts by weight to about 10 times by weight of the diisocyanate, with amounts within the range of about 1–5 times by weight being preferred. To the thus-formed solution of the diisocyanate there is added the polyhydroxy compound, the relative amounts of diisocyanate and polyhydroxy compounds being such as to provide the mole ratio of reactants as has been described hereinabove and form the desired polyhydroxy modified diisocyanate.

Typically, the reaction times and temperatures for effecting this modification are within the range of about 10 minutes to 3 hours at temperatures within the range of about 10° centigrade to 80° centigrade. Preferably, the times are from about 30 minutes to 1 hour at temperatures from 35° centigrade to 50° centigrade. As has been previously indicated, these products will contain at least 1.5 NCO groups.

Once the desired modified product is formed, additional solvent may be added to the reaction mixture to obtain the impregnating solution having the desired concentration. Alternatively, of course, the polyhydroxy modified diisocyanates may be prepared separately and thereafter dissolved in the solvent in appropriate amounts to form the impregnating solution.

Additionally, it is to be appreciated that the water repellent compositions of the present invention may be applied as an emulsion, rather than as a solution. In such instances, the polyisocyanate, modified as has been indicated above, is admixed with a suitable emulsifying agent and dispersed in water. These emulsion systems like the solution may contain from about 0.5 to 50% by weight of the polyisocyanate material, with the heigher concentrations also being usable. For many applications, however, emulsion systems having a solids content of from about 1-15% by weight are preferred. Suitable emulsifying agents which may be used are anionics such as the alkyl and alkyl aryl sulfonates and sulfates and nonionics, such as the alkylene ethers. Typically, the anionics will contain from about 4 to about 30 carbon atoms in the alkyl portion and from 6-10 carbon atoms in the aryl portion. The nonionics will typically contain from about 4 to about 4 to about 30 carbon atoms and from about 1 to 15 moles of alkylene oxide. In many instances, it has been found to be desirable to include a fatty acid soap in the emulsion. Such soaps typically contain from about 8 to about 26 carbon atoms and are emplified by the alkali metal stearates, palmitates and the like. The term alkali metal is intended to include sodium, potassium, lithium, cesium and rubidium.

A typical emulsion containing 10% solids for use in the present method will contain the following components in the amounts indicated:

| Components: | Parts by weight |
|---|---|
| Polyisocyanate composition (as a 35% solution in toluene) | 2.85-28.5 |
| Soap | 0.3-3 |
| Surface active agent | 0.2-1.0 |
| Water | Balance to make 100 |

If desired, this emulsion may be further diluted with water, emulsions having a solids content as low as 0.1% having been found to be useful. It is to be noted that in this emulsion, it is desirable that the surface active agent is present in the minimum amount needed to hold the emulsion. In this manner, the rewetting effect of the surface active agent is minimized. Additionally, the presence of the soap is found to aid in forming and holding the emulsion and also in reducing the rewetting effect.

The cellulosic materials, such as a cotton textile material or paper, may be impregnated with the polymerizable shrinkproofing solution or emulsion prepared as indicated hereinabove, using any convenient means. For example, the cotton may be immersed or padded in the treating solution or emulsion and the fabric then passed through squeeze rolls to remove excess solution. If desired, as with paper, the treating emulsion or solution may be applied to the paper by spraying, rather than by immersion. Other suitable application techniques, as are known to those in the art, may also be used. After the cellulosic materials have been impregnated with the emulsion or solution, they are preferably dried so as to remove the solvent from the material. Desirably, the impregnation is carried out so that the treated cellulosic material has a resin add-on within the range of about 1 to about 15% by weight of the material. Higher resin add-on than 15%, e.g., 40 to 50%, may be attained in some instances although, generally, it has not been found that such higher add-ons appreciably improve the water repellency which is obtained. Generally, it has been found that resin add-ons appreciably less than 15%, e.g., 0.05 to 5% are often sufficient to provide durable water repellency of the cellulosic materials. Typically, the treating solution or emulsion is maintained at a temperature within the range of about 10° centigrade to the boiling point of the solvent used, e.g., 120° centigrade for perchloroethylene, and preferably is within the range of about 20° centigrade to about 30° centigrade during the impregnation step. Thereafter, the impregnated material is dried, preferably in an oven, at a temperature within the range of about 20° centigrade to the boiling point of the solvent used, with temperatures within the range of about 65° centigrade to about 125° centigrade being preferred.

Following the impregnation and drying of the cellulosic material, the thus-treated material is then cured in water. Although various techniques may be utilized in effecting this cure, where the treated material is a cellulosic textile, the material is preferably immersed in water and maintained in the water until the curing is complete.

It has been found that the time to effect the desired cure of the modified isocyanate material with which the cellulosic textile is impregnated varies with the temperature at which the cure is effected. Accordingly, it is desirable that the water used is at an elevated temperature, temperatures within the range of about 40° centigrade to about 100° centigrade being typical, with temperatures within the range of about 80° centigrade to about 94° centigrade being preferred. When carrying out the water cure at these temperatures, curing times within the range of about 1 hour to about 1 minute are typical, with times of 30 minutes to 2 minutes being preferred. It is to be appreciated, that where the length of curing time is not an important factor, the water cure of the modified isocyanate impregnant may be carried out at room temperature, i.e. about 20° centigrade. Under such conditions, the curing time may be as long as several days, e.g., 48 hours. There is, however, some indication that the full water repelling effectiveness of the modified isocyanate compositions may not be attained when the water cure is carried out under these low temperature conditions. Moreover, it has been found that low temperature curing techniques, and particularly those carried out below about 75° centigrade, may not impart to the treated fabric the desired degree of durability to dry cleaning solvents, such as trichloroethylene. In many instances, after curing under these conditions, dry cleaning of the fabric may remove appreciable quantities of the cured water repellant material. Accordingly, low temperature curing techniques are generally not preferred for cellulosic textiles.

It is to be further appreciated, that if desired, the water cure of the modified isocyanate impregnant in either a textile or non-textile material may be effected by substantially saturating the impregnated cellulosic material with water and thereafter, completing the polymerization or cure of the modified isocyanate by heating the water-wet, substantially saturated material at an elevated temperature. In such processes, curing temperatures within the range of about 66° centigrade to about 177° centigrade for periods of about 30 minutes to about 1 minute are typical, with temperatures within the range of about 107° to about 135° centigrade for periods of 10 minutes to about 3 minutes being preferred. After the water cure of the impregnated material has been completed, the material is then dried to remove any water which may remain. Frequently, when using water impregnation of the treated material, followed by heating at an elevated temperature, the curing and drying of the impregnated material is effected substantially simultaneously.

It has further been found that in some instances water in vapor form may be used to effect the cure of the impregnated cellulosic material. Such water may be as steam, water vapor or the like, including water vapor in the atmosphere. The use of water in this form has been found to be of value in curing impregnated paper. In such a process, the paper which has been impregnated with the treating solution or emulsion is then brought into contact with water vapor, as for example, in an area of relatively high humidity and cured either with or without the application of heat. In many instances, it has been found sufficient if the paper is cured at room temperature in the atmosphere. Such a curing technique is satisfactory for paper or other cellulosic materials which, during use, will not be subjected to repeated washings and/or dry cleanings and which, normally, will not be reused numerous times. In such materials, any reduction in durability of the impregnant due to the way the water cure is carried out will not be of great consequence.

It has been found that in many instances the water used to carry out the polymerization or cure of the modified isocyanate impregnant in the textile material is desirably slightly alkaline. Typical pH values for the curing water are within the range of about 7.5 to 9. Where the pH of the curing water is below these values, it may be adjusted by adding thereto an alkaline material, such as an alkali metal bicarbonate. Additionally, if desired, the curing water may also contain small amounts of a suitable wetting agent, to insure more thorough and rapid wetting of the impregnated material. Typical wetting agents which may be used are nonionics, such as the polyalkylene ethers and anionics such as alkyl aryl sulfonates and sulfates. These materials are typically present in amounts within the range up to about 1% by weight of the treating water, amounts within the range of about 0.05 to about 0.2% being preferred.

As has been indicated hereinabove, the process of the present invention may be carried out on cellulosic materials in various forms, including yard on sheet goods, finished articles, such as coats and the like, as well as on pulp, the unspun fiber or the yarn itself. It has been found that cellulosic materials, such as cotton and paper, which have been treated in accordance with this process consistently show excellent water repellency, and the wet strength and burst strentgh of treated paper is also good. Moreover, it has been found that the water repellency is retained by the treated fabrics even after numerous washings in hot water and that the hand and feel of the treated materials are not substantially different from those of untreated material. Additionally, the water repellent finish is durable to dry cleaning and is found to impart dimensional stability to the fabric. It also facilitates dying and improves dye fastness.

In order that those skilled in the art may better understand the present invention and the manner in which it may be practiced, the following specific examples are given. It is to be understood that these examples are illustrative of the invention and are not intended to be limitations thereon. In these examples, unless otherwise indicated, temperatures are in degrees centigrade and parts and percentages are by weight. Additionally, in these examples one or more of the following tests are used to evaluate the treated materials:

(1) Spray test.—Federal Specification CCC-T-191b-#5526 or American Association of Textile Chemists and Colorists #22-1964

250 milliliters of water is sprayed downwardly, through a standard nozzle, on the sample which is held at a 45° angle to the horizontal. The degree of wetting is compared to standard photographs. 100 is excellent—no wetting and 0 is complete absorbency.

(2) Hydrostatic test.—Federal Specification CCC-T-191b-#5512-2

The amount of water, in grams, is measured which penetrate the sample in 10 minutes at a hydrostatic head of 8 inches.

(3) Impact penetration test.—Federal Specification CCC-T-191b-#5522

The amount of water, in grams, is measured which penetrates the sample when 500 milliliters of water is sprayed on the sample from a height of 2 feet.

(4) Water absorbency test.—American Association of Textile Chemists and Colorists 21-1964

The weight percent of water which is absorbed by the sample during a 24 hour immersion in water is measured.

(5) Methanol/water test

The specimen is contacted for 15 seconds with various methanol-water solutions containing from 0–100% by volume methanol. Specimen is given a rating corresponding to the methanol content of the solution which just doesn't wet the surface of the specimen. 0 is the lowest rating—no water repellency and 100 is the highest.

(6) Bag test

The fabric is shaped to form a bag and water, to a depth of 4 inches, is added. Leakage during 24 hours is noted. If no leakage occurs, fabric is rated as passing. If there is leakage, fabric is noted as failing.

(7) Tensile strength test

Carried out on a Scott tensile tester using a jaw opening of 3 inches, a rate of travel of 12 inches per minute and measured in the machine direction. Results are in pounds/inch of width of the specimen.

(8) Burst test

Carried out on a Mullin burst tester using Technical Association of Pulp and Paper Institute Test T-403m-53. Results are in pounds/square inch.

Additionally, in the wet Gurley stiffness, wet tensile strength and wet burst strength tests, the properties were determined after the specimen had been immersed in water for 24 hours.

EXAMPLE 1

Caster oil (0.066 moles) and toluene diisocyanate (0.20 mole) were reacted in 111 gram of trichloroethylene at 60–70° centigrade for 1 hour. Cetyl alcohol (0.04 mole) was then added and the reaction continued for another 30 minutes at 60–70° centigrade. Free NCO content was found to 6.76%.

This product was diluted, applied to 80# unbleached kraft paper at a 90% wet pick-up and the treated paper was cured as indicated below. After curing, the water repellency of the paper was tested and the following results were obtained:

| Percent concentration in trichloroethylene. | 1.0 | 0.5 | [1] 0.1 control |
|---|---|---|---|
| Cure | | 2 days at 65% relative humidity. | |
| Spray rating | 75 | 70 | 70 | 0 |
| Tensile, wet, percent of dry | 15 | 14 | 11 | 5 |
| Brush, wet, percent of dry | 21 | 20 | 14 | 9 |
| Water absorption, percent | 59 | 64 | 78 | 121 |

[1] Control.

EXAMPLE 2

Trimethylol propane (0.333 mole) and toluene diisocyanate (1.0 mole) were reacted as in Example 1, then cety alcohol added and again reacted, as in Example 1. The product was emulsified in water containing 5% of a calcium alkyl benzene sulfonate-polyoxyethylene emulsifiers (Emcol 300X and Emcol 500X), the final emulsion having a 10% resin solids content. This emulsion was applied to a 50# unbleached kraft paper as shown in the table below and the treated paper cured as in Example 1. The water repellency of the paper was tested with the following results.

| Resin add-on, percent | 0.1 | 0.5 | 1.0 | Control |
|---|---|---|---|---|
| MeOH-water rating | 20 | 50 | 50 | 0 |
| Hydrostatic test, (grams) | 0 | 0 | 0 | Fails |
| Water absorption (percent) | 126 | 83 | 75 | 115 |
| Burst, wet, percent of dry | 15 | 22 | 23 | 14 |
| Tensile, wet, percent of dry | 9 | 13 | 14 | 8 |

EXAMPLE 3

Castor oil (1.0 mole) and toluene diisocyanate (2.8 moles) were reacted in trichloroethylene for 1 hour at 50–60° centigrade to yield a final solution containing 50% solids. The free NCO content was 7.45%.

A stock emulsifier solution was made up as follows:

| | Parts |
|---|---|
| Water | 1025 |
| Sodium stearate soap | 25 |
| Sodium laurylsulfate | 10 |

The resin solution was then emulsified to form a 10% solids emulsion as follows:

| | Parts |
|---|---|
| Resin solution (50%) | 20 |
| Emulsifier solution | 21 |
| Water | 59 |

This mixture was agitated in a Waring Blendor for 60 seconds to effect an excellent, stable emulsion.

This emulsion was applied to one side of a 50 pound kraft paper, previously sized with 1.0% rosin, by means of a doctor blade having a clearance of 0.003 inch. The coating did not strike through the sized paper, and was dried and cured at 120° centigrade for 5 minutes. This procedure was repeated a total of three times, producing a film having a thickness of about 0.001 inch. The treated paper was impervious to water and to vegetable oils, such as corn oil and castor oil.

EXAMPLE 4

The resin of Example 3 was emulsified so as to yield a water in oil emulsion. To 50 grams of the resin solution was added, with stirring, 25 grams of the stock emulsifier solution. This emulsion was applied to the rosin sized paper, as described in Example 3, using the 0.003 inch clearance doctor blade. This emulsion, having the oil phase as the exterior phase, penetrated the paper completely. Upon drying and curing for 5 minutes at 120° centigrade, the paper resembled glassine paper. It was completely impervious to water, vegetable oils and also to such low viscosity solvents as heptane and toluene.

EXAMPLE 5

The modified diisocyanate of Example 1, as a 5% solution in trichloroethylene was padded onto cotton cloth at a wet pick-up of 90%. The treated cloth was dried in air and then cured by immersion in water for 10 minutes at 72° centigrade, the water having a pH of 8, adjusted with sodium bicarbonate. The thus-treated fabric was then tested for water repellency with the following results:

| | Treated Cotton | Control |
|---|---|---|
| Spray test | 50.0 | 0 |
| Impact penetration test (grams) | 2.4 | 50 |

EXAMPLE 6

The procedure of Examples 1 and 5 is repeated with treating solutions prepared by using the polyhydroxy compounds and diisocyanates in the amounts shown in the following table. In each instance, the reaction times and temperatures are varied as necessary to obtain the indicated reaction product. With all of these treating solutions, the paper and cotton treated has a water repellency comparable to that of the treated samples in Examples 1 and 5.

| Sample | Polyhydroxy compound | Moles of polyhydroxy compound | Diisocyanate compound | Moles of diisocyanate compound | Free NCO per mole of reaction product |
|---|---|---|---|---|---|
| A | 1,2,3,4,5,6 hexane hexol. | 1 | Alpha, naphthyl diisocyanate. | 4 | 4 |
| B | Penta erythritol | 1 | m-Phenylene diisocyanate. | 2 | 2 |
| C | Trimethylol heptadecane. | 2 | 1,4-cyclohexylene diisocyanate. | 3 | 1–5 |
| D | Erythrulose | 1 | Hexamethylene diisocyanate. | 2 | 2 |
| E | Dextrose | 1 | 4,4'-diphenylpropane diisocyanate. | 3 | 3 |
| F | Glycerose disaccharide. | 1 | 3,3'-dimethoxy-4,4'-diphenylene diisocyanate. | 4 | 4 |
| G | Sabinic acid triglyceride. | 2 | 2,3-butylene diisocyanate. | 6 | 3 |
| H | Aleuritic acid monoglyceride. | 1 | Cyclopentylidene diisocyanate. | 4 | 4 |
| I | Jalopinolic acid triglyceride. | 3 | 2,4-chlorophenyl diisocyanate. | 6 | 2 |
| J | Trihydroxy n-butyric acid. | 1 | 3,3'-bitoluene-4,4'-diisocyanate. | 3 | 3 |
| K | Hexahydroxy heptonic acid. | 2 | 1,5-naphthalene diisocyanate. | 6 | 3 |
| L | Idonic acid | 1 | Ethylidene diisocyanate. | 4 | 4 |
| M | Sorbitan monopalmitate. | 1 | Methylene-bis-(4-phenyl diisocyanate. | 2 | 2 |
| N | Polyoxyethylene sorbitan monooleate. | 2 | n-Hexyldiisocyanate. | 3 | 1.5 |
| O | Sorbitol polyoxyethylene sorbitol laurate. | 1 | Decamethylene diisocyanate. | 3 | 3 |
| P | Tetrakis(hydroxymethyl)phosphonium chloride. | 1 | Ethylene diisocyanate. | 2 | 2 |
| Q | Glycerol | 1 | 2,6-toluene diisocyanate. | 3 | 3 |

What is claimed is:

1. A method of making cellulosic materials water repellent which comprises contacting the cellulosic material to be treated with a solution consisting essentially of a polyhydroxy-modified isocyanate composition containing

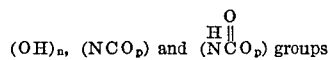

wherein $n$ is a number from 0 to 4.5, $p$ is a number from 1.5 to 6 and $n+p$ is a number from 3 to 6, said polyhydroxy-modified isocyanate being the reaction product of a polyhydroxy compound containing $m$ hydroxyl groups and a diisocyanate, said reactants being in a ratio of one mole of polyhydroxy compound to $m-n$ moles of diisocyanate, wherein $m$ is a number from 3 to 6 and $m-n$ is at least 1.5, and thereafter, curing the thus-treated material with water.

2. The method as claimed in claim 1 wherein the polyhydroxy modified diisocyanate in the treating solution is an isocyanate having the formula

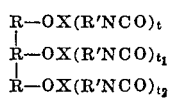

wherein $t$, $t_1$ and $t_2$ are numbers from 0–1 and the sum of $t$, $t_1$ and $t_2$ is at least 1.5; X is hydrogen when $t$, $t_1$ or $t_2$ is 0 and

when $t$, $t_1$ or $t_2$ is 1; R is alkyl containing from 1–25 carbon atoms or aralkyl containing from 8–30 carbon atoms; and R' is alkyl, alkaryl, aralkyl or aryl containing from 6–40 carbon atoms.

3. The method as claimed in claim 2 wherein the modified isocyanate is contained in the treating solution in an amount within the range of about 1 to about 50% by weight of the solution.

4. The method as claimed in claim 3 wherein the water curing of the impregnated cellulosic material is effected by immersing the impregnated cellulosic material in water at a temperature within the range of about 40° centigrade to about 100° centigrade for a period of from about 1 hour to about 1 minute.

5. The method as claimed in claim 3 wherein the water cure is effected by impregnating the modified isocyanate treated cellulosic material with water and, thereafter, heating the thus-water impregnated material at a temperature within the range of about 66° to about 177° centigrade for a time within the range of about 30 minutes to about 1 minute.

6. The method as claimed in claim 3 wherein the modified isocyanate is applied as an emulsion.

References Cited

UNITED STATES PATENTS

| 3,112,984 | 12/1963 | Aldridge | 8—116.2 XR |
| 3,238,010 | 3/1966 | Habib et al. | 8—116.2 XR |
| 3,245,827 | 4/1966 | Weber | 8—116.2 XR |
| 3,290,350 | 12/1966 | Hoover | 8—116.2 XR |

OTHER REFERENCES

Sauders: "High Polymers," vol. XVI, Poly-urethanes Chemistry & Technology Part II Technology, 1964, pp. 456–466.

MAYER WEINBLATT, Primary Examiner

U.S. Cl. X.R.

117—62.1, 76 143; 260—29.2